P. EBELING.
CAP FOR THREADED GLASS RECEPTACLES.
APPLICATION FILED DEC. 2, 1918.

1,298,313.

Patented Mar. 25, 1919.

Inventor.
Phillip Ebeling.
By H. E. Dunlap,
Attorney.

UNITED STATES PATENT OFFICE.

PHILLIP EBELING, OF MOUNDSVILLE, WEST VIRGINIA, ASSIGNOR, BY MESNE ASSIGNMENTS, TO LENA E. EBELING, OF MOUNDSVILLE, WEST VIRGINIA.

CAP FOR THREADED GLASS RECEPTACLES.

1,298,313.  Specification of Letters Patent.  Patented Mar. 25, 1919.

Application filed December 2, 1918. Serial No. 264,925.

*To all whom it may concern:*

Be it known that I, PHILLIP EBELING, a citizen of the United States of America, and resident of Moundsville, county of Marshall, and State of West Virginia, have invented certain new and useful Improvements in Caps for Threaded Glass Receptacles, of which the following is a specification.

This invention relates to caps for glass receptacles or containers, and more particularly to a cap or cover for salt and pepper shakers, glass jars, and the like.

The primary object of the invention is to provide a detachable cap or cover for that class of glass receptacles or containers having screw threads formed on the necks thereof, which cap or cover shall be free from the objectionable features of those caps or covers heretofore commonly used which are composed wholly of glass, as also those caps or covers composed wholly of sheet metal.

As is well known, all-glass caps are objectionable in that, in applying the same to the threaded necks of glass containers, there is involved a grinding of the glass threads thereof upon the glass threads of said necks, which grinding may, and sometimes does, result in the chipping off of small particles of glass which may enter the contents of the container. Further, caps composed wholly of sheet metal are objectionable as unsanitary, especially in salt shakers, on account of the well-known tendency of the metal to tarnish and corrode.

The objections above noted are obviated by the provision in the present invention of a composite cover consisting of a glass top which is alone exposed to contact with the contents of the container, and a rigidly attached sheet metal collar which alone threads upon the neck of the container.

In describing the invention in detail, reference is herein had to the accompanying drawings, in which—

Referring to said drawings, in which like designating characters distinguish like parts throughout the several views—

1 indicates a sheet metal collar having screw threads formed therein, said collar being terminated at its upper end by an annular flange 2 which is preferably directed internally, but which might be directed externally if desired. Permanently associated with said metal collar is a top 3 of glass, the same being pressed in the process of manufacture to firmly embed therein the annular flange 2 and adjacent portion of said collar. In the embodiment of the invention herein shown an annular projecting rim $3^a$ of the glass top 3 is disposed in embracing relation to the upper part of the collar, and an annular lug-like portion $3^b$ of said top is disposed interiorly of the collar and in underlying relation to the flange 2 of said collar.

As is obvious, when the device is applied to a glass jar 4 or other container having the usual threaded neck $4^a$, the threads of the latter are engaged only by the sheet metal collar 1. Further, when the cap is fully seated, little if any of the collar is exposed to contact with the contents of the container. Thus, it will be apparent that I secure all the advantages possessed by either glass or sheet metal caps, and at the same time overcome the objectionable features of both.

While I prefer to employ the annular flange 2 at the upper end of the collar, such flange might be omitted without departing from the general principle or spirit of the invention, as the upper end of an unflanged collar would be firmly and permanently embedded in the glass top in the process of pressing the latter, due to the propensity of glass in its heated plastic state to tenaciously adhere to thin sheet metal.

Figure 1:
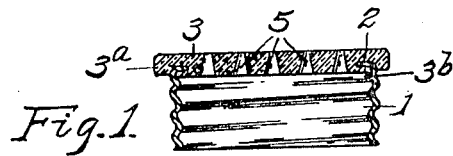
Figure 1 is a vertical section of a cap for a salt or pepper shaker, and—
Figure 2:
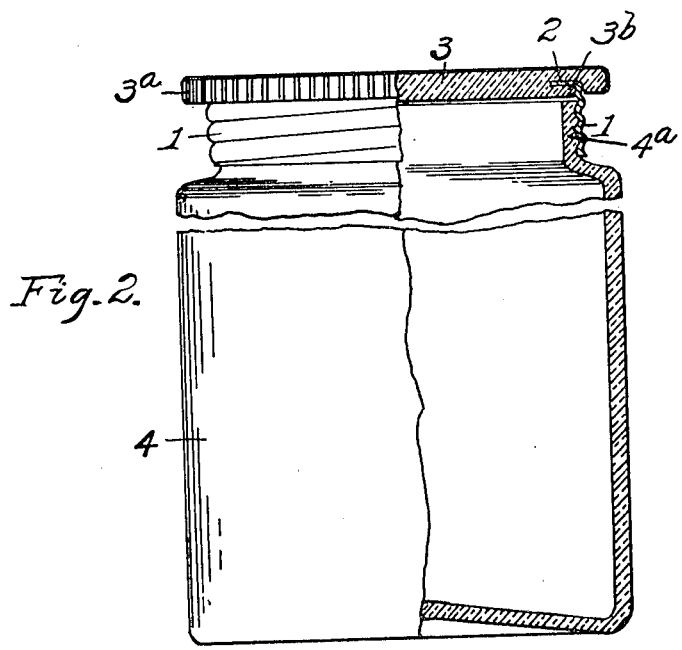
Fig. 2 is a view partly in side elevation and partly in section illustrating the application of the invention to a glass jar.

When the cap is designed for use as a part of a salt or pepper shaker, the glass top 3 is provided with suitable perforations, as shown at 5 in Fig. 1.

What is claimed is—

1. A cap for glass containers having integral threaded necks, consisting of a threaded sheet metal collar or sleeve having both ends open, and a glass top mounted in closing relation to the upper end of said sleeve, said glass top having the upper end of said sleeve firmly embedded therein.

2. A cap for glass containers having integral threaded necks, consisting of a threaded sheet metal collar or sleeve having both ends open and provided with an upper annular terminal flange, and a glass top closing the upper end of said sleeve and having said flange permanently embedded therein.

3. A cap for glass containers having integral threaded necks, consisting of a sheet metal collar having threads for engagement with such neck, and having an upper terminal flange, and a glass top mounted upon said collar, said top having said flange permanently embedded therein and having an annular rim projecting outward beyond said collar.

4. A cap for glass containers having integral threaded necks, consisting of a sheet metal collar having threads for engagement with such neck, and having an internal terminal flange at its upper end, and a glass top mounted on said collar with its outer edge disposed in embracing relation to the upper end of said collar and with a portion engaged interiorly with said collar in underlying relation to said flange.

5. A cap for glass containers having integral threaded necks, consisting of a sheet metal collar having threads for engagement with such neck, and having an internal terminal flange at its upper end, and a glass top permanently mounted upon the upper end of said collar with a portion thereof disposed interiorly of the latter and in underlying relation to said flange.

In testimony whereof I affix my signature in presence of two subscribing witnesses.

PHILLIP EBELING.

Witnesses:
EVERETT MOORE,
JAMES F. SHIPMAN.